United States Patent [19]

Naaktgeboren

[11] Patent Number: 4,750,418
[45] Date of Patent: Jun. 14, 1988

[54] HYDRAULIC BALER DENSITY CONTROL WITH HYDRAULIC SENSORS

[75] Inventor: Adrianus Naaktgeboren, Zedelgem, Belgium

[73] Assignee: New Holland Inc., New Holland, Pa.

[21] Appl. No.: 20,850

[22] Filed: Mar. 2, 1987

[30] Foreign Application Priority Data

Mar. 4, 1986 [EP] European Pat. Off. ........ 86200337.3

[51] Int. Cl.[4] .......................... B30B 15/26; B30B 9/30
[52] U.S. Cl. ......................................... 100/50; 100/43; 100/192
[58] Field of Search ............... 100/43, 192, 50, 189; 56/341

[56] References Cited

U.S. PATENT DOCUMENTS

| | | |
|---|---|---|
| 2,576,784 | 11/1951 | Dodds et al. .................. 100/43 |
| 2,718,189 | 9/1955 | Bornzin . |
| 2,763,201 | 9/1956 | Hauswirth .................... 100/43 |
| 3,121,387 | 2/1964 | Fuhrwerk et al. . |
| 3,467,000 | 9/1969 | Seltzer ...................... 100/192 X |
| 4,037,528 | 7/1977 | White et al. . |
| 4,148,254 | 4/1979 | Graber et al. . |
| 4,185,446 | 1/1980 | Clostermeyer et al. . |
| 4,280,403 | 7/1981 | Alderson . |
| 4,565,123 | 1/1986 | Sanders ...................... 100/43 |

FOREIGN PATENT DOCUMENTS

| | | |
|---|---|---|
| 0152970 | 8/1985 | European Pat. Off. . |
| 1802438 | 5/1969 | Fed. Rep. of Germany . |
| 2360413 | 3/1978 | France . |

Primary Examiner—Andrew M. Falik
Attorney, Agent, or Firm—Darrell F. Marquette; Frank A. Seemar; Larry W. Miller

[57] ABSTRACT

A baler comprises a bale chamber having at least one wall movable generally laterally of the bale chamber to vary the cross-sectional area thereof and hydraulic actuator means operable to move the laterally movable bale chamber wall. The baler further comprises hydraulic sensor means coupled to, and operable to sense the load on, the movable wall of the bale chamber and to control the actuator means when that load exceeds a predetermined value, whereby the cross-sectional area of the bale chamber is increased to relieve said load. This allows the baler to produce bales of substantially constant density irrespective of varying crop conditions.

10 Claims, 4 Drawing Sheets

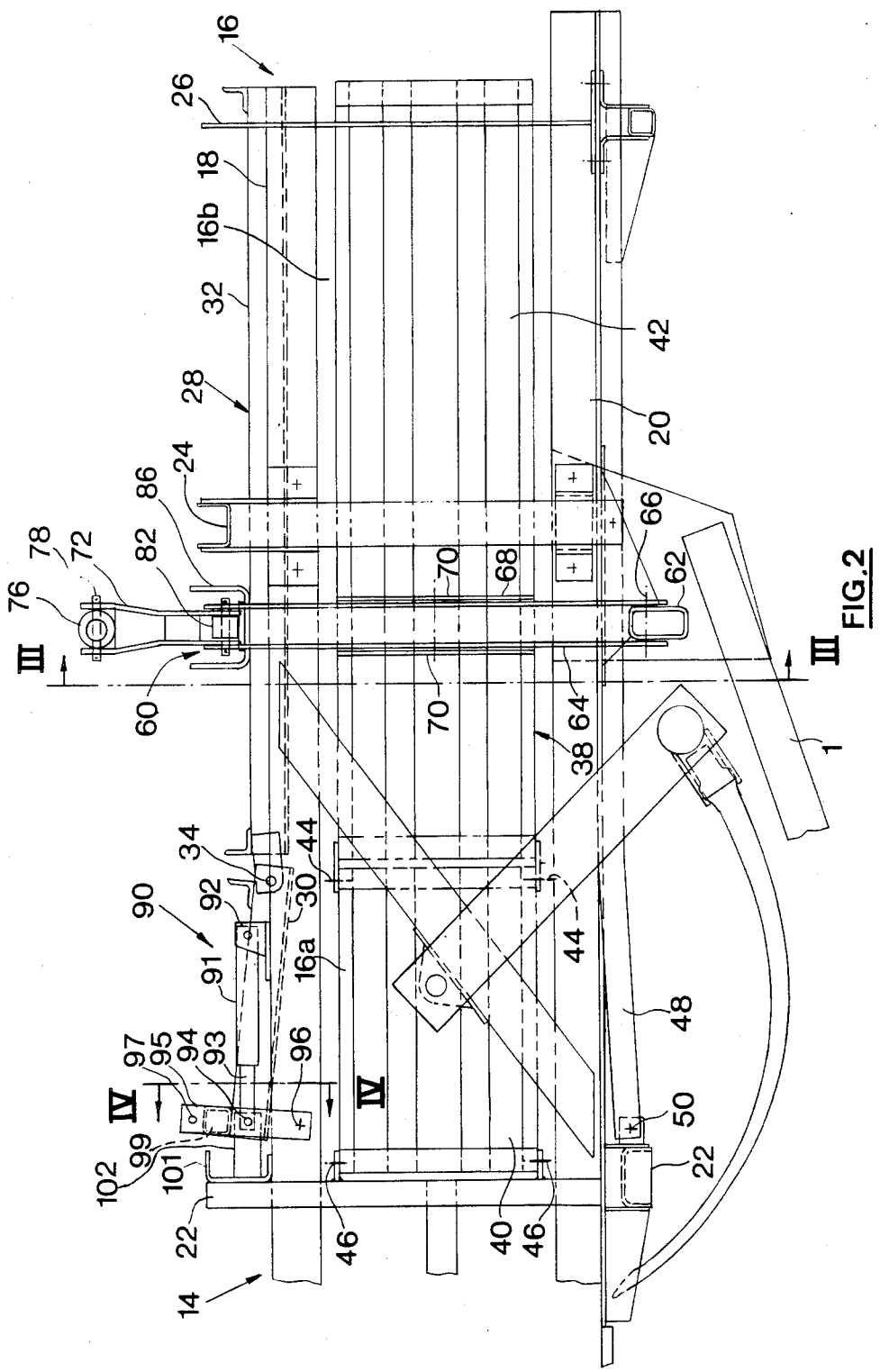

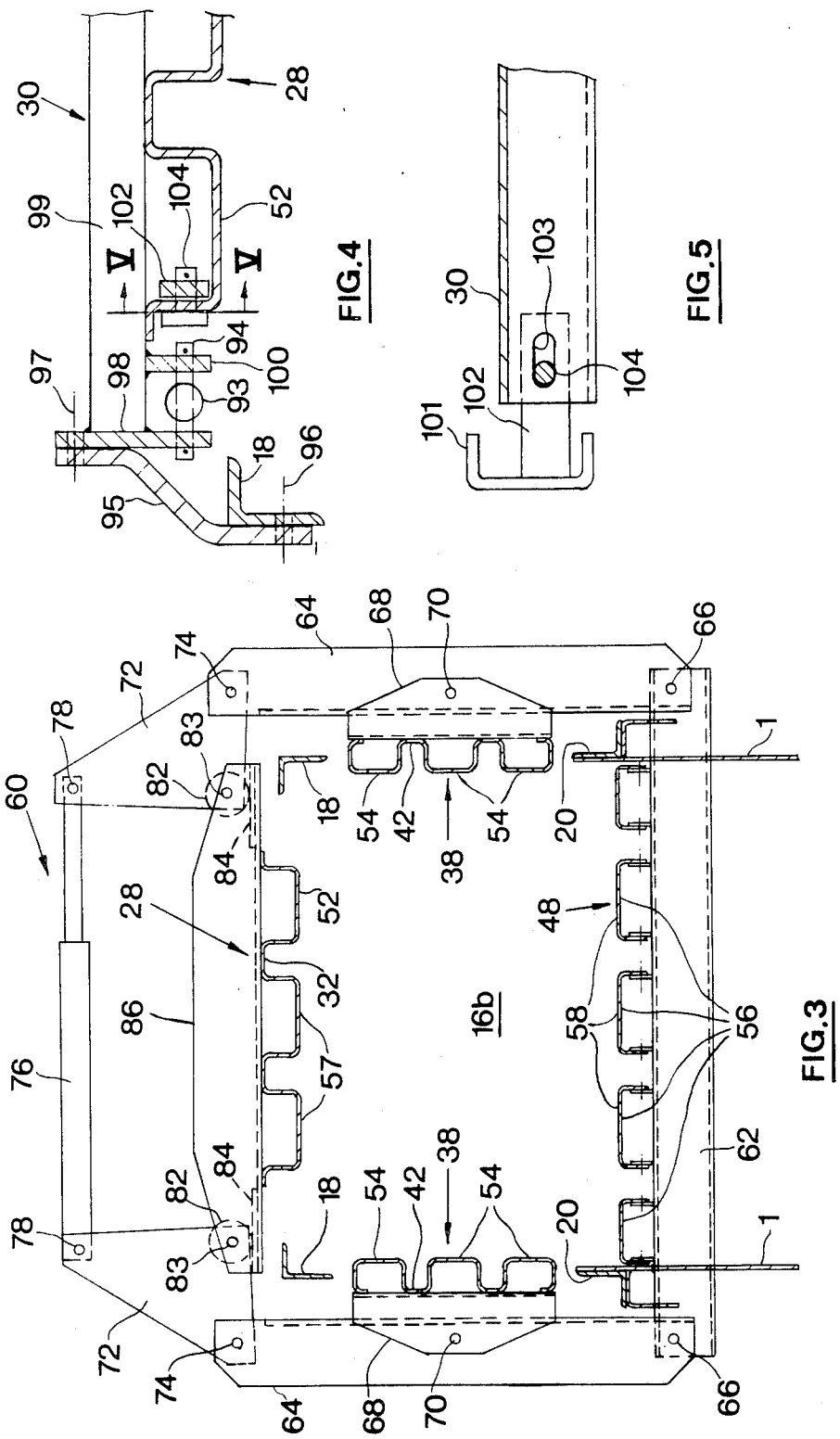

HYDRAULIC BALER DENSITY CONTROL WITH HYDRAULIC SENSORS

BACKGROUND AND SUMMARY OF THE INVENTION

This invention relates generally to agricultural balers and, more particularly, to such balers which are fitted with density control mechanisms.

It is common in the agricultural baler art to control the density of a bale being formed by adjusting the position of one or more so-called tension rails which, in effect, define the walls of a bale chamber in which a bale is formed. Such a baler is disclosed in U.S. Pat. No. 4,489,648 and the mechanism for adjusting one or more of the tension rails of the bale chamber is simplified, compared with prior mechanisms.

The density control mechanism of U.S. Pat. No. 4,489,648 operates satisfactorily under normal operating conditions but problems can arise when handling crop material having a high moisture content because the increased friction between the crop material and the tension rails in the bale chamber can result in plugging of the machine, possibly with the attendance breakage of shear bolts in the drive line to the baler plunger. The rectification of either or both of these events results in down time of the machine which is unacceptable.

According to the present invention there is provided a baler comprising a bale chamber having at least one wall movable generally laterally of the bale chamber to vary the cross-sectional area thereof and hydraulic actuator means operable to move the laterally movable bale chamber wall. The improvement comprises hydraulic sensor means coupled to, and operable to sense the load on, the movable wall of the bale chamber and to control the actuator means when that load exceeds a predetermined value, whereby the cross-sectional area of the bale chamber is increased to relieve said load. This allows the baler to produce bales of substantially constant density irrespective of varying crop conditions.

Thus the present invention provides means for sensing the load on a wall of the bale chamber and for increasing the cross-sectional area of the bale chamber when that load exceeds a predetermined value. Accordingly, the load is then relieved and continual movement through the bale chamber of a bale being formed is achieved, thereby preventing plugging of the machine and/or the breakage of shear bolts in the baler plunger drive line.

Preferably, the hydraulic sensor means is connected to a source of pressure fluid through a non-return valve, the same source of pressure fluid also being connected to the hydraulic actuator means operable to adjust the position of one or more walls of the bale chamber, and itself being connected to a resrvoir via a pressure relief valve. The sensor means is conveniently in the form of a pair of hydrualic cylinders each connected between a frame member of the machine and the movable wall of the bale chamber. The hydraulic cylinders are connected in parallel. The sensor means may be associated with the top wall of the bale chamber and may be arranged to sense the load on that wall in the general direction of movement of crop material through the bale chamber.

DESCRIPTION OF THE DRAWINGS

A baler in accordance with the present invention will now be described in greater detail, by way of example with reference to the accompanying drawings, in which:

FIG. 2 is an enlargement of part of FIG. 1 with certain components removed,

FIG. 3 is a section on the line III—III of FIG. 2,

FIG. 4 is a partial section, to a larger scale, on the line IV—IV of FIG. 3,

FIG. 5 is a section on the line V—V of FIG. 4, and

DESCRIPTION OF THE PREFERRED EMBODIMENT

Figure 1:
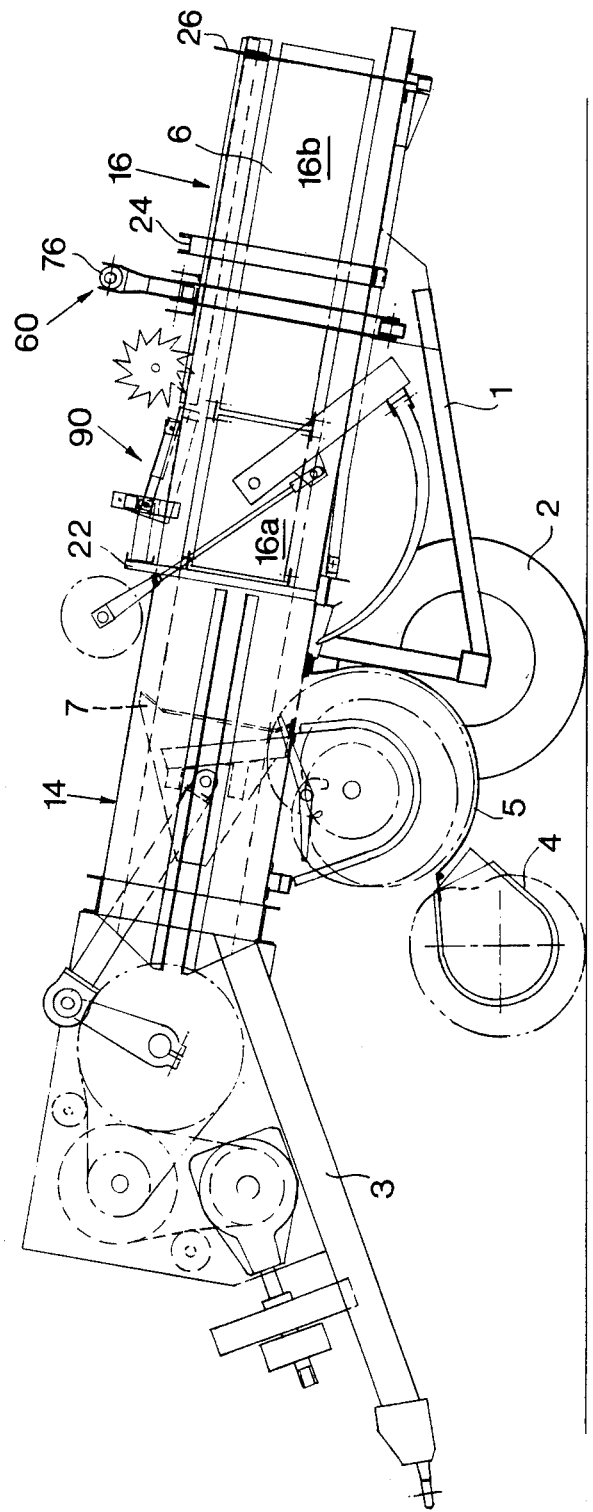
FIG. 1 is a side elevational view of the baler.

Referring first to FIG. 1, the baler is basically conventional in that it comprises a main frame 1 fitted with a pair of ground-engaging wheels 2 and a tow bar 3.

A pick-up mechanism 4 picks up crop material from the ground and delivers it to a feed chamber 5 from where it is transferred to a bale case or chamber 6 in which a bale of crop material is formed. A plunger 7 is reciprocable within the bale chamber 6 to act upon and compress wads of crop material transferred from the feed chamber 5 into a bale which moves progressively along the bale chamber from left to right as seen in FIG. 1. A completed bale is tied with twine or the like and discharged from the machine.

The construction of the bale chamber 6 is as disclosed in U.S. Pat. No. 4,489,648, incorporated herein by reference. More specifically, and referring to FIGS. 2 to 5, the bale chamber 6 comprises a forward portion 14 with fixed dimensions (only a small portion of which is shown in FIG. 2) and a rearward portion 16. The rearward portion 16 includes upper corner rails 18 and lower corner rails 20 which are held stationary by collar-like frames 22,24,26 which extend around the outside of the bale chamber 6 and are rigidly connected, such as by bolts or welding, to the corner rails 18,20. The bale chamber rearward portion 16 also includes a top center rail 28 comprised of a first section 30 and a second section 32 pivotally connected together at 34. The first section 30 also being pivotally connected to the frame 22 in a manner to be described hereafter in more detail. The bale case rearward portion 16 further includes identical, opposed side rails 38 each formed of a first section 40 and a second section 42 pivotally connected together by pins 44. The first section 40 of each side rail 38 is also pivotally connected to the frame 22 by pins 46. Finally, the bale chamber rearward portion 16 also has a bottom rail 48 fixed at 50 to the frame 22.

The first and second sections 30,32 of the top rail 28 and the first and second sections 40,42 of the side rails 38 are each preferably formed of a piece of sheet mtal folded into a corrugated pattern as best seen in cross-section in FIG. 3. The top rail first and second sections 30,32 have relatively flat surfaces 52 which engage the top of a bale moving through the bale case 6. The side rail first and second sections 40,42 have relatively flat surfaces 54 which engage the sides of a bale moving through the bale case 6.

The bottom rail 48 includes a series of inverted generally U-shaped channel members 56 arranged side-by-side. The bottom rail members 56 have relatively flat surfaces 58 on which a bale rests while moving through the bale chamber 6. The rails 28,38 and 48 provide, in part, the effective walls of the bale chamber 6 and constitute the conventional so-called tension rails.

The top rail first section 30 and the underlying portion of the bottom rail 48 are inclined relative to each other so that the vertical distance between their opposed surface 52 and 58 gradually decreases from left to right as seen in FIG. 2. The side rail first sections 40 also are inclined relative to each other so that also the horizontal distance between their opposed surfaces 54 gradually decreases from left to right as seen in FIG. 2. The top rail second section 32 and the underlying portion of the bottom rail 48 are maintained generally parallel to each other so that the vertical distance between their opposed surfaces 52 and 58 is substantially constant from left to right as seen in FIG. 2. Also the side rail second sections 42 are maintained generally parallel to each other so that also the horizontal distance between their opposed surfaces 54 is substantially constant from left to right as seen in FIG. 2.

With the top rail 28, the side rails 38, and the bottom rail 48 formed and arranged as described above, the bale chamber rearward portion 16 has a chamber area 16a of gradually tapering height and width, and a chamber area 16b of substantially uniform height and width. As is well known in the baler art, this helps to form bales which are of a satisfactory density but with no distortion in shape.

A control mechanism 60 is provided for changing the positions of the first and second sections 30,32 of the top rail 28 and for changing the positions of the first and second sections 40,42 of the side rails 38 so as to adjust the relative positions of the top and bottom rails 28,48 and the opposed side rails 38, respectively, and thus also to adjust the shape and dimension of the chamber area 16a as well as the dimension of the chamber area 16b of the bale chamber rearward portion 16, thereby to adjust bale density.

The control mechanism 60 includes a bottom member 62 which forms part of the main frame 1, extends transversely of the bale chamber rearward portion 16 and is located underneath the bottom rail 48. The control mechanism 60 further also comprises linkage or side members 64 pivoted at their lower ends by pins 66 to the outer ends of the bottom member 62. Brackets 68, pivoted by pins 70 to the linkage members 64, are rigidly attached to the side rail second sections 42. The side members 64, brackets 68 and pins 70 also provide the main support for the side rail first and second sections 40,42. Lever members 72 are pivoted by pins 74 to the upper ends of the linkage or side members 64.

Power means in the form of a hydraulic cylinder unit 76 of the contracting type, is pivotally connected at its ends by pins 78 to the lever members 72. The lever members 72 carry rollers 82 on pins 83 which engage portions 84 of a top member 86 that is located above, and secured to, the top rail second section 32. The top member 86 also supports the top rail first and second sectiosn 30,32. The bottom member 62 is preferably of generally rectangular cross-section while the side members 64 and the top member 86 are preferably of generally U-shaped cross-section.

The control mechanism 60 is operated by contracting the hydraulic actuator unit 76, whereupon the lever members 72 are moved towards each other and pivoted inwardly on the pins causing the side members 64 to be pivoted inwardly on the pins 66, and also simultaneously causing the top member 86 to be pushed downwardly by the rollers 82. This causes the side rail sections 42 to be moved inwardly towards each other to reduce the horizontal distance between their opposed surfaces 54. The side rail second sections 42 remain parallel to each other due to the fact that the side members 64 are pivoted by the points 70 to the brackets 68. The inward movement of the side rail second sections 42 causes the side rail first sections 40 to be pivoted via the pins 44 and 46 to a position where they become inclined at a greater angle with respect to each other.

The side rail first sections 40 are then positioned so that the horizontal distance between their opposed surfaces 54 decreases at a faster rate from left to right in FIG. 2. Simultaneously with the inward movement of the side rail second sections 42, the top rail second section 32 is moved downwardly towards the bottom rail 48 to reduce the vertical distance between their opposed surfaces 52 and 58. The top rail second section 32 remains parallel to the underlying portion of the bottom rail 48. The downward movement of the top rail second section 32 causes the top rail first section 30 to be pivoted via the pins 34 and the special coupling of the top rail first section 30 to the frame 22 (still to be described hereinafter in more details) to a position where it becomes inclined at a greater angle with respect to the bottom rail 48. The top rail first section 30 is then positioned relative to the bottom rail 48 so that the vertical distance between their opposed surfaces 52 and 58 decreases at a faster rate from left to right as seen in FIG. 2.

It will be understood from the foregoing description that the control mechanism 60 is utilized to change the height and width of the bale chamber area 16b as well as the degree of tapering of the bale chamber area 16a as seen in the direction of movement of bales through the bale case 6 in order to adjust bale density. By contracting the hydraulic cylinder unit 76, the bale chamber area 16b is generally reduced in height and the bale chamber area 16a is caused to taper at a greater rate as seen in the direction of movement of bales through the bale case 6, thereby usually resulting, during operation, in greater bale density. Conversely, by extending the hydraulic cylinder unit 76, the bale chamber area 16b is generally enlarged in height and width and the bale chamber area 16a is caused to taper to a lesser degree thereby usually resulting, during operation, in lower bale density.

The lever members 72 are each constructed so that the distance between the pins 74 and 83 divided by the distance between the pins 78 and 83 is equal to the combined area of the surfaces 54 (effective pressure surface) of one side rail second section 42 divided by the combined area of the surfaces 52 (effective pressure surface) of the top rail second section 32. With the lever members 72 constructed in this manner, the side rail second sections 42 and the top rail second section 32 apply equal surface pressure on all sides of a bale which results in uniform bale density. It is further noted that the pivot points 74,83,78 of the lever members 72 define a triangle.

The control mechanism 60 is positioned at a location along the length of the bale chamber rearward portion 16 as shown in FIG. 2 which causes the top rail second section 32 to remain parallel to the underlying portion of the bottom rail 48 and which also causes the side rail second sections 42 to remain parallel to each other. More particularly, the control mechanism 60 is provided genreally at the middle of the total length of the bale tension rails 28,38,48 on the one hand (see FIG. 1), and generally at one-third of the length of the second sections 32,42, of the top and side rails 28,38, as seen in the direction of movement of the bales through the bale case 6, on the other hand (see FIG. 2).

It will be appreciated that as crop material is forced into the tapering bale chamber 6 on reciprocation of the plunger 7, the loading on the plunger will depend on the loading on the bale chamber walls or tension rails 28,38,48 which in turn depends largely on the coefficient of friction between the crop material and the walls of the bale chamber 6. If the crop material has a higher moisture content, then this coefficient of friction increases significantly, sometimes to such an extent that the bale chamber 6 becomes blocked as the plunger is unable to overcome the resistance to movement of the bale being formed through the bale chamber 6. This can happen with wet sraw which, when dry, is normally baled without difficulty. This also can happen when baling silage which always has a high natural moisture content and is therefore a difficult crop to handle at all times. There is indeed a recent trend to also bale silage.

Accordingly, there is a need to be able to relieve the normal forces applied to the bale chamber tension rails to control bale density in the event of a potential blockage of the machine and to this end, the present invention provides hydraulic sensor means indicated generally at 90 and comprising a pair of hydraulic actuators, the cylinder 91 of which are pivotally attached at 92 to the upper corner rails 18 forming part of the main frame 1, and the pistons 93 of which are pivotally attached at 94 to plates 98, 100 secured to a transverse beam 99 forming part of the top rail first section 30. The plates 98 at the opposite ends of the transverse beam 99 also are pivotally coupled at 97 to associated arms 95 which in turn are pivotally attached at their lower ends at 96 to the respective upper corner rails 18 of the bale chamber 6.

The two sensors 91,93 are disposed at opposed sides of the bale chamber 6 in association with the top wall of the latter. This arrangement results in the top rail 28 being movable generally longitudinally of the bale chamber 6.

As seen in FIGS. 2 and 5, a U-shaped beam 101, forming part of the frame 22, is disposed at the forward end of the upper tension rail 28 and has two lugs 102 extending therefrom in a rearward direction. Pins 104 are attached thereto and are slidingly engaged within elongated slots 103 provided in associated sides of the upper tension rail section 30. This pin and slot arrangement 103,104 is provided to limit the extension of the associated sensors 91,93 and the movement of the top rail 28 in the longitudinal direction.

Figure 6:
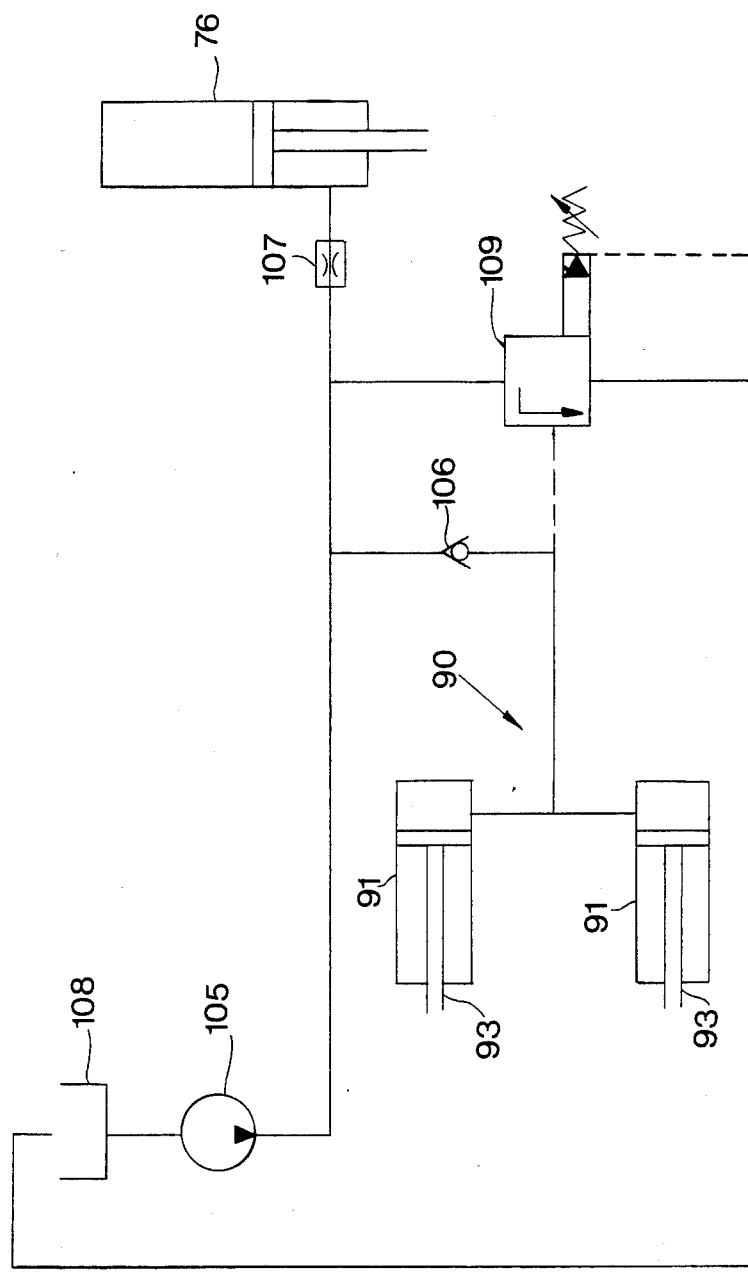
FIG. 6 is a hydraulic circuit diagram.

Turning now to FIG. 6, it will be seen that the two sensors 91,93 are connected hydraulically in parallel with the maximum volume ends of the cylinders 93 connected to a source of constant pressure fuid provided by a pump 105 via a non-return valve 106, the pump also supplying the actuator 76 of the density control mechanism 60 via a restrictor 107 which serves to damp the operation of the actuator 76 in a conventional manner. The sensors 91,93 are connected to a reservoir or tank 108 via an adjustable relief valve 109 which also serves to connect the actuator 76 to the tank 108.

In operation of the baler, crop material is picked up from the ground by the pick-up mechanism 4 which feeds it to the feed chamber 5 from which it is transferred in wads to the bale chamber 6 in the normal way. Each wad of material is forced by the plunger 7 further into the bale chamber 6 and density of the bale thus formed by the accumulation of wads is controlled by the mechanism 60, the walls of the bale chamber 6 normally being continually squeezed inwardly as a result of contraction of the actuator 76 by the application of pressure fluid to the minimum volume or annular end of the actuator.

For the sake of ease of understanding, the operation of the bale density sensing and adjusting mechanism first will be described hereinafter in the hypothetical condition where the bales being formed, move continuously through the bale case 6 and therefore are subjected to a continuous load directed longtudinally of the bale case 6 and toward the discharge end thereof. Under these conditions the continual supply of pressure fluid by the pump 105 is leaked to the tank 108 by the fact that the relief valve 109 opens as soon as the supply pressure via the non-return valve 106 is exceeding the predetermined value at which the relief valve 109 is set to provide a by-pass to the tank 108 thus creating a constant system pressure. Also, should for the one or another reason the system pressure in the actuator cylinder 76 tend to creep up, said pressure would also be relayed via the non-return valve 106 to the relief valve 109, which thereby would open further to bypass more fluid to the tank 108 to maintain the system pressure constant and the actuator 76 stationary. Similarly, if to the contrary, the system pressure would tend to drop for the one or other reason, the relief valve 109 would close sightly to compensate for said system pressure drop. It will be noted that, in the normal operating condition of the baler, when the friction coefficient of the crop remains the same, the pressures in the sensors 91,93 and the actuator 76 always are the same by virtue of the controlling operation of the pressure relief valve 109. Also under this normal operating condition, there is a continuous flow of excessive pressure fluid from the pump 105 via the pressure relief valve 109 to the tank 108.

If, still in this hypothetical condition, during operation, the load on the upper tension rail 28 increases, due to an increase in friction between the crop material being baled and the bale chamber, e.g., as a result of an increased moisture content, (or for any other reason), then there is a slight movement of the tension rail 28 longitudinally of the bale chamber 6 and thus a slight contraction of the sensor pistons 93 within the cylinders 91 so as to increase the cylinder pressures. However, this increase in pressure cannot be transmitted through the non-return valve 106 or relief valve 109 to the actuator 76 and when this isolated pressure exceeds the predetermined relief valve pressure, the latter opens further and additionally allows the pressure fluid in the sensors 91,93 to drain to the tank 108 and thereby also the pressure fluid in the actuator 76 to drain to the tank 108 whereby the actuator 76 extends and hence opens up the bale chamber 6, i.e., increases its cross-sectional area through reverse operation of the density control mechanism 60. Accordingly, the load on the walls of the bale chamber 6 and hence which also will allow bales of constant density to be formed. When the force on the top rail 28 of the bale chamber 6 has been relieved to this extent corresponding to the preset value of the pressure relief valve 109, said relief valve 109 closes back to its normal operating condition and the bale density control mechanism 60 resumes its normal operation at a different setting.

If to the contrary, the load on the upper tension rail 28 decreases during operation due to a decrease in friction between the crop material being baled and the bale chamber 6, e.g., as a result of a decreased moisture content (or for any other reason), then there is a corresponding pressure drop within the cylinders 91.

Under these conditions the pressure relief valve 109 will not open further to drain pressure fluid until the predetermined system pressure is reached; i.e., the pump 105 will supply pressure fluid to the actuator 76 to contract the same and hence also to decrease the cross-sectional dimensions of the bale chamber 6. Accordingly, the bales being formed will be subjected to an increased resistance against moving through the bale case 6 whereby the bale density will be increased accordingly until eventually the level thereof is consistent with the desired density as set with the setting of the pressure relief valve 109 and at which time the pressure relief valve 109 will open to drain further pressure fluid being supplied by the pump 105 an thus to prevent further contraction of the actuator 76.

The coefficient of friction of crop material normally can vary between 0.25 for very dry straw and 0.7 for wet silage. The sensing cylinders 91,93 preferably are dimensioned such that a pressure increase therein over and above the system working pressure and resulting from a frictional force between the bales being formed and the bale case walls associated with a coefficient of friction of 0.25, is sufficiently large to operate the pressure relief valve 109 i.e., to opens aid valve to drain pressure fluid. Thereby the bale density control system is operable to maintain the bale density generally at any desired value as set by means of the pressure relief valve under all operating conditions.

Turning now to the actual operation of the baler, it will be appreciated that bales being formed are moved intermittently through the bale case 6, rather than continuously, by the plunger 7 which is reciprocated back-and-forth in said bale case. The compressing force and pressure on the bales being formed thus continuously oscillates and the maximum peak loads depend on the resistance experienced by the bales against movement through the bale case 6. This in turn largely depends on the setting of the tension rails 28,38 and 48 and the frictional forces between the bales being formed and said tension rails. With an increased resistance, wads of crop material are compressed more and thus a higher bale density is obtained.

In practice, the relief valve 109 is opened to a larger or lesser degree, dependent on the friction forces, during each compressing stroke of the plunger 7 to leak a larger or smaller slug of pressure fluid from the actuator 76 to the tank 108 resulting in a corresponding expansion of the bale case 6 so as to top off the resistance against bale movement to a larger or lesser degree and to the predetermined value corresponding to the desired bale density, whereby the bales being formed are moved through the bale case 6 during each plunger compression stroke through a longer or shorter distance so as to level out the bale density. During each retraction stroke of the plunger 7, when the bales being formed do not move through the bale case 6 and thus also no friction forces are sensed by the sensing cylinders 91,93, the hydraulic pump 105 again supplies pressure fluid to the actuator 76 thus retracting said actuator until eventually the system pressure is restored whereafter the pressure relief valve 109 is opened.

Thus, in summary, the system under normal operating conditions is operated during each plunger cycle to a larger or lesser degree whereby the desired bale density is approximated. In other words, the density control system 60 breathes during each plunger cycle to the extent that the actuator 76 is extended to a larger or lesser amount during each compressing stroke and subsequently is retracted during each return stroke of the plunger.

It should be appreciated that the movement of the top rail 28 and hence pistons 93 is only of the order of 2–3 mm, this being sufficient for the sensors 91,93 to operate and control the load on the bale chamber walls as described above.

The extent of movement of the pistons 93 out of the cylinders 91 is limited by the pins 104 operating within the slots 103. This arrangement allows variation in convergence of the top rail first section 30 but can be dispensed with by ensuring that the pistons and cylinders 93,91 are fully extended in the stable or normal condition of the baler, i.e., when the sensors do not detect any abnormal load on the bale chamber walls.

It will be seen that the present invention provides a simple but highly effective control of the forces acting on the bale chamber, ensuring that the cross-sectional area of the chamber is increased appropriately to prevent any blockage if the forces increase beyond a predetermined value. It should be noted that the sensor system is entirely self-contained and does not need any extra power supply over and above that required by the main density control actuator.

Having thus described the invention, what is claimed is:

1. In a baler including a bale chamber at least one wall movable generally laterally of the bale chamber to vary the cross-sectional area thereof, and hydraulic actuator means operable to move the laterally movable bale chamber wall, wherein the improvement comprises:
   hydraulic sensor means coupled to and operable to sense the load on the movable wall of the bale chamber and to control the hydraulic actuator means when said load exceeds a predetermined value, whereby the cross-sectional area of the bale chamber is increased to relieve said load; and
   the sensor means including a pair of hydraulic cylinders connected between respective frame members of the machine and said movable wall of the bale chamber to which the sensor means is coupled for sensing the load therein; the sensor cylinders being connected hydraulically in parallel.

2. In a baler according to claim 1, wherein the sensor means are arranged to sense frictional load in the general direction of movement of crop material through the bale chamber on said wall to which the sensor means is coupled.

3. In a baler according to claim 2, wherein the hydraulic sensor means and the actuator means are connected to a common source of pressure fluid through a hydraulic coupling; the hydraulic coupling to the sensor means comprising a non-return valve disposed so as to prevent fluid flow in the direction from the sensor means to the actuator means.

4. In a baler according to claim 2, wherein said wall to which the sensor means is coupled, is mounted for movement generally longitudinally of the baler by arms disposed at respective sides thereof and pivotally attached at one end to frame members of the baler and pivotally attached at the other end to said wall.

5. In a baler according to claim 3, wherein a pressure relief valve is provided between the actuator means and a tank and with the pressure sensitive side thereof coupled directly to the sensor means on the one hand and indirectly via the non-return valve to the actuator means on the other hand; the arrangement being such that, under normal operating conditions, the pressure in the actuator means also is applied via said non-return valve to the pressure sensitive side of the relief valve to control operation thereof and, when the pressure in the sensing means exceeds the pressure in the actuator means, the non-return valve is closed and the pressure in the sensor means takes priority over the pressure in the actuator means to control operation of the pressure relief valve.

6. In a baler according to claim 4, wherein the pressure relief valve is adjustable.

7. In a baler according to claim 1, wherein a restrictor is provided in a pressure supply line connected to the actuator means for damping the operation thereof.

8. In a baler according to claim 1, wherein means are provided for limiting the extension of each sensor cylinder.

9. In a baler according to claim 8, wherein the sensor means are associated with the top wall of the bale chamber.

10. In a baler according to claim 9, wherein the sensor cylinders are disposed at respective sides of the bale chamber and each pivotally attached to respective frame members on the one hand and to opposite sides of the top wall on the other hand.

* * * * *